United States Patent
Miyake (10) Patent No.: US 10,046,605 B2
(45) Date of Patent: Aug. 14, 2018

(54) PNEUMATIC TIRE

(71) Applicant: TOYO TIRE & RUBBER CO., LTD., Osaka-shi, Osaka (JP)

(72) Inventor: Akinori Miyake, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 253 days.

(21) Appl. No.: 15/221,026

(22) Filed: Jul. 27, 2016

(65) Prior Publication Data

US 2017/0028782 A1 Feb. 2, 2017

(30) Foreign Application Priority Data

Jul. 29, 2015 (JP) ................. 2015-150101

(51) Int. Cl.
*B60C 9/22* (2006.01)
*B60C 9/18* (2006.01)
(Continued)

(52) U.S. Cl.
CPC .................. *B60C 9/20* (2013.01); *B60C 9/22* (2013.01); *B60C 9/28* (2013.01); *B60C 3/04* (2013.01);
(Continued)

(58) Field of Classification Search
CPC .... B60C 3/00; B60C 3/04; B60C 9/18; B60C 9/20; B60C 9/22; B60C 9/2204
See application file for complete search history.

(56) References Cited

U.S. PATENT DOCUMENTS 8,490,667 B2 * 7/2013 Ishiyama .............. B60C 9/2009
152/526
2009/0211685 A1 8/2009 Kabe et al.
(Continued)

FOREIGN PATENT DOCUMENTS

CN 104703814 A 6/2015
EP 596737 * 1/1996
(Continued)

OTHER PUBLICATIONS

Office Action dated Dec. 29, 2017, issued in counterpart Chinese Application No. 201610591386.7, with English translation. (18 pages).

(Continued)

*Primary Examiner* — Justin R Fischer
(74) *Attorney, Agent, or Firm* — Westerman, Hattori, Daniels & Adrian, LLP (57) ABSTRACT

A pneumatic tire has a belt layer between a carcass and a tread portion. The belt layer has first and second main working belts, and a reinforcement belt. A cord angle of the reinforcement belt is not smaller than 6 degrees and not larger than 9 degrees and width thereof is equal to or wider than 50% of a tire-section width and not wider than either narrower one of the first and second main working belts. In a state where the pneumatic tire is mounted on a predetermined rim and filled with a minute internal pressure with no load applied, an arc passing points on both maximum width positions and a point on a tire equatorial plane of the reinforcement belt, in meridian section, has a radius of curvature of not smaller than 2500 mm. A total thickness $T_{CE}$ and $T_{SH}$ satisfy a relationship of $1.05 T_{SH} \leq T_{CE} \leq 1.35 T_{SH}$.

6 Claims, 7 Drawing Sheets

(51) Int. Cl.
*B60C 3/04* (2006.01)
*B60C 9/20* (2006.01)
*B60C 9/28* (2006.01)
*B60C 11/00* (2006.01)

(52) U.S. Cl.
CPC ........... *B60C 2009/2016* (2013.01); *B60C 2009/2019* (2013.01); *B60C 2009/2022* (2013.01); *B60C 2009/2048* (2013.01); *B60C 2009/2228* (2013.01); *B60C 2009/283* (2013.01); *B60C 2011/0033* (2013.01); *B60C 2200/06* (2013.01)

(56) References Cited

U.S. PATENT DOCUMENTS

| | | |
|---|---|---|
| 2015/0165822 A1 | 6/2015 | Koutoku |
| 2015/0258857 A1 | 9/2015 | Ishikawa |
| 2015/0314648 A1 | 11/2015 | Sejalon |
| 2015/0375568 A1 | 12/2015 | Wang |
| 2016/0009140 A1 | 1/2016 | Ono |
| 2016/0068023 A1 | 3/2016 | Kunugi |

FOREIGN PATENT DOCUMENTS

| | | | |
|---|---|---|---|
| EP | 1902867 | * | 3/2008 |
| JP | 2-270607 | * | 6/1990 |
| JP | 2005-104437 A | | 4/2005 |
| JP | 2007-45334 A | | 2/2007 |
| JP | 5182455 B1 | | 4/2013 |
| JP | 2014-189243 A | | 10/2014 |
| JP | 2014-213649 A | | 11/2014 |
| WO | 2014/095957 A1 | | 6/2014 |
| WO | 2014/103064 A1 | | 7/2014 |

OTHER PUBLICATIONS

Qi Yu et al., "Ziwuxian Luntai Jiegousheji Yu Zhizaojishu", Chemical Industry Press, Feb. 2006. Cited in Chinese Office Action.

Office Action dated Jul. 4, 2017, issued in counterpart Chinese Application No. 201610591386.7, with English translation. (17 pages).

* cited by examiner

PNEUMATIC TIRE

CROSS-REFERENCE TO RELATED APPLICATION

This application claims priority of Japanese Patent Application No. 2015-150101 filed on Jul. 29, 2015, the content of which is incorporated herein by reference.

BACKGROUND OF THE INVENTION

Technical Field
The present invention relates to a pneumatic tire.
Related Art
In a pneumatic radial tire for a heavy load used for a vehicle such as a truck or a bus, it has been known that a belt layer arranged between a carcass and a tread portion includes a reinforcement belt with cords having a small inclination angle with respect to the tire-circumferential direction (cord angle) of 0 to 5 degrees (see JP 2007-45334 A, JP 2005-104437 A, JP 2014-189243 A, Japanese Patent No. 5182455, JP 2014-213649 A, for example). The reinforcement belt is intended to suppress a growth of the tire in the radial direction.

SUMMARY OF THE INVENTION

The small cord angle of the reinforcement belt ranging from approximately 0 to 5 degrees increases a force for holding a shape of the tread portion to reduce distortion at an end portion of the belt, and therefore is advantageous in view of belt durability.

However, the small cord angle of the reinforcement belt ranging from approximately 0 to 5 degrees causes an excessively large binding force in a tire-radial direction, thereby promoting an increased tendency in the deformation of a tire in the tire-width direction. The increased deformation in the tire-width direction increases the deformation of the tire at an area ranging from a bead portion to a portion having a largest width in a tire cross section. As a result, distortion in the bead portion is increased, causing lower resistance against a defect such as separation in the bead portion (bead durability).

A case where the cord angle of the reinforcement belt is not smaller than 6 degrees is weaker in suppression of the deformation in the tire-radial direction than the case where the cord angle is approximately 0 to 5 degrees, which is apt to cause ununiform stiffness of the tire in the tire-width direction. This results in deterioration of the partial wear resistance of the tread portion.

It is an object of the present invention is to provide a pneumatic tire that ensures belt durability and an effect of suppressing a growth of the tire in a tire-radial direction and enhances bead durability and partial wear resistance.

An aspect of the present invention provides a pneumatic tire, comprising a belt layer arranged between a carcass and a tread portion, wherein the belt layer comprises, a first main working belt, a second main working belt arranged at an outer side of the first main working belt in a tire-radial direction, and a reinforcement belt, wherein a cord angle of the second main working belt differs from a cord angle of the first main working belt in a direction with respect to a tire-circumferential direction, wherein a cord angle of the reinforcement belt is not smaller than 6 degrees and not larger than 9 degrees, and wherein a width of the reinforcement belt is equal to or wider than 50% of a tire-section width and not wider than either narrower one of the first and second main working belts.

In this specification, the term "cord angle" is defined an acute angle which a cord of a belt or a ply forms with respect to a tire-circumferential direction. When the cord extends in the tire-circumferential direction, the cord angle is 0 degrees.

The cord angle of the reinforcement belt is set to a value not smaller than 6 degrees and not larger than 9 degrees, instead of setting the cord angle to a small angle such as an angle of not smaller than 0 degrees and not larger than 5 degrees (an angle substantially regarded as 0 degrees or an angle close to such angle). Such configuration can obviate a phenomenon where a binding force in a tire-radial direction generated by the reinforcement belt becomes excessively large, and therefore can suppress the excessively large deformation of the tire in the tire-width direction. As a result, the distortion generated in the bead portion can be suppressed, and therefore bead durability can be enhanced.

The cord angle of the reinforcement belt set to a value not smaller than 6 degrees and not larger than 9 degrees reduces an effect of suppressing a growth of the tire in the tire-radial direction compared to the case where the cord angle is set to a value not smaller than 0 degrees and not larger than 5 degrees. However, the cord angle of the reinforcement belt is allowed to take 9 degrees at maximum, and therefore there is no possibility that a binding force in the tire-radial direction is excessively reduced. Further, the width of the reinforcement belt is equal to or wider than 50% of a tire-section width. That is, the reinforcement belt has a sufficiently wide width instead of the narrow width. Due to the above-mentioned reasons, the tire can ensure a desired effect of suppressing a growth of the tire in the radial direction. Further, the tire can acquire a sufficient force for holding a shape of the tread portion so that distortion at an end portion of the belt can be reduced whereby the tire can ensure required belt durability. The width of the reinforcement belt is not wider than either narrower one of the first and second main working belts. Accordingly, the distortion generated in the reinforcement belt can be reduced.

As described above, according to the pneumatic tire of the present invention, bead durability can be enhanced while ensuring an effect of suppressing a growth of the tire in the radial direction and belt durability.

Preferably, in a state in which the pneumatic tire is mounted on a predetermined rim and is filled with a minute internal pressure with no load applied thereto, an arc passing points on both maximum width positions of the reinforcement belt and a point on a tire-equatorial plane of the reinforcement belt, in meridian section, has a radius of curvature of not smaller than 2500 mm, and wherein a total thickness $T_{CE}$ from a tread profile to a tire-inner peripheral surface on the tire-equatorial plane and a total thickness $T_{SH}$ from a tread profile to a tire-inner peripheral surface at an outermost main groove, on an outermost side in a tire-width direction, of main grooves extending in a circumferential direction satisfy a relationship of $1.05T_{SH} \leq T_{CE} \leq 1.35T_{SH}$.

The minute internal pressure refers to a pressure at least required for holding the shape of the tire mounted on the predetermined rim.

The tread profile refers to the outline (surface profile) of the tread portion in meridian section. However, the tread profile refers to the contour of the tread portion in a supposed case where the tread portion has no groove formed therein.

The point on the maximum width position and the point on the tire-equatorial plane may be points on positions of the same thickness on the reinforcement belt. For example, these points may be points on an outer peripheral surface of the reinforcement belt, points on an inner peripheral surface of the reinforcement belt, or points on positions of the same thickness between the outer peripheral surface and the inner peripheral surface.

In the state in which the pneumatic tire is mounted on the predetermined rim and is filled with the minute internal pressure with no load applied thereto, the radius of curvature of reinforcement belt is not smaller than 2500 mm in meridian section. In other words, in the state in which the pneumatic tire is filled with the minute internal pressure, that is, in an initial state of a growth (inflation), the reinforcement belt can be regarded to have an almost flat meridian sectional shape. In raising from the minute internal pressure to a predetermined internal pressure, therefore, the pneumatic tire is uniformly grown with ease while the reinforcement belt is held to be almost flat. As a result, the stiffness of the pneumatic tire in the tire-width direction is uniformly held with ease while the cord angle and end count of a belt cord in the reinforcement belt are almost uniformly held.

In addition, the above relationship is satisfied between the total thickness $T_{CE}$ on the tire-equatorial plane and the total thickness $T_{SH}$ at the outermost main groove. As a result, since the reinforcement belt is almost flat, substantially, the thickness of the tread portion gradually decreases from the tire-equatorial plane to the outermost main groove. In other words, the outermost main groove-side tire diameter is smaller than the tire-equatorial plane-side tire diameter. This suppresses the ground contactability of the outermost main groove-side tread portion which comes into contact with the ground with ease because of the deformation of a side portion of the pneumatic tire with a load applied thereto. In the state in which a load is applied to the pneumatic tire, thus, the tread portion has a ground contact surface shape which becomes almost uniform from the tire-equatorial plane to the outermost main groove.

Accordingly, even when the cord angle of the reinforcement belt is not smaller than 6 degrees and not larger than 9 degrees, the pneumatic tire can be almost uniformly grown (inflated) with ease, and the stiffness of the pneumatic tire in the tire-width direction can be almost uniformly held. Moreover, since the pneumatic tire has the ground contact surface shape which becomes almost uniform from the center portion to the shoulder portion in the tire-width direction, the partial wear resistance of the tread portion can be enhanced.

Preferably, when an imaginary line connecting bottoms of the main grooves in the tire-width direction is defined as a groove bottom line and the belt, on the outermost side in the tire-radial direction, of the belt layers is defined as an outermost belt, a thickness $TA_{CE}$ from the groove bottom line to the outermost belt on the tire-equatorial plane and a thickness $TA_{SH}$ from the groove bottom line to the outermost belt at the outermost main groove satisfy a relationship of $1.5TA_{SH} \leq TA_{CE} \leq 2.5TA_{SH}$.

The thickness to the belt refers to a thickness from a reference line (herein, the groove bottom line) to an outermost diameter position of the belt cord, which is disposed on the belt, in the tire-radial direction.

Since the above relationship is satisfied between $TA_{CE}$ and $TA_{SH}$, the partial wear of the tread portion can be suppressed. If $TA_{CE}$ is less than 1.5 times as small as $TA_{SH}$, the center portion is hard to come into contact with the ground as compared with the shoulder portion, so that a skid occurs at the center portion. This tends to partially wear the center portion. On the other hand, if $TA_{CE}$ is 2.5 times as large as $TA_{SH}$, the shoulder portion is hard to come into contact with the ground as compared with the center portion, so that a skid occurs at the shoulder portion. This tends to partially wear the shoulder portion.

Preferably, when the belt, on the outermost side in the tire-radial direction, of the belt layers is defined as an outermost belt, a thickness $TB_{CE}$ from the tread profile to the outermost belt on the tire-equatorial plane and a thickness $TB_{SH}$ from the tread profile to the outermost belt at the outermost main groove satisfy a relationship of $1.1TB_{SH} \leq TB_{CE} \leq 1.6TB_{SH}$.

Since the above relationship is satisfied between $TB_{CE}$ and $TB_{SH}$, the partial wear of the tread portion can be suppressed. If $TB_{CE}$ is less than 1.1 times as small as $TB_{SH}$, the center portion is hard to come into contact with the ground as compared with the shoulder portion, so that a skid occurs at the center portion. This tends to partially wear the center portion. On the other hand, if $TB_{CE}$ is 1.6 times as large as $TB_{SH}$, the shoulder portion is hard to come into contact with the ground as compared with the center portion, so that a skid occurs at the shoulder portion. This tends to partially wear the shoulder portion.

Preferably, when an imaginary line connecting bottoms of the main grooves in the tire-width direction is defined as a groove bottom line, a thickness $TC_{CE}$ from the groove bottom line to the reinforcement belt on the tire-equatorial plane and a thickness $TC_{SH}$ from the groove bottom line to the reinforcement belt at the outermost main groove satisfy a relationship of $1.3TC_{SH} \leq TC_{CE} \leq 1.8TC_{SH}$.

Since the above relationship is satisfied between $TC_{CE}$ and $TC_{SH}$, the partial wear of the tread portion can be suppressed. If $TC_{CE}$ is less than 1.3 times as small as $TC_{SH}$, the center portion is hard to come into contact with the ground as compared with the shoulder portion, so that a skid occurs at the center portion. This tends to partially wear the center portion. On the other hand, if $TC_{CE}$ is 1.8 times as large as $TC_{SH}$, the shoulder portion is hard to come into contact with the ground as compared with the center portion, so that a skid occurs at the shoulder portion. This tends to partially wear the shoulder portion.

Preferably, a thickness $TD_{CE}$ from the tread profile to the reinforcement belt on the tire-equatorial plane and a thickness $TD_{SH}$ from the tread profile to the reinforcement belt at the outermost main groove satisfy a relationship of $1.0TD_{SH} \leq TD_{CE} \leq 1.4TD_{SH}$.

Since the above relationship is satisfied between $TD_{CE}$ and $TD_{SH}$, the partial wear of the tread portion can be suppressed. If $TD_{CE}$ is less than 1.0 time as small as $TD_{SH}$, the center portion is hard to come into contact with the ground as compared with the shoulder portion, so that a skid occurs at the center portion. This tends to partially wear the center portion. On the other hand, if $TD_{CE}$ is 1.4 times as large as $TD_{SH}$, the shoulder portion is hard to come into contact with the ground as compared with the center portion, so that a skid occurs at the shoulder portion. This tends to partially wear the shoulder portion.

The pneumatic tire can have an aspect ratio of not larger than 70% and a nominal section width of not smaller than 365.

According to the present invention, it is possible to ensure belt durability and an effect of suppressing a growth of a tire in a tire-radial direction and to enhance bead durability and partial wear resistance.

BRIEF DESCRIPTION OF THE DRAWINGS

The foregoing and the other features of the present invention will become apparent from the following description and drawings of an illustrative embodiment of the invention in which.

DETAILED DESCRIPTION OF THE INVENTION

Figure 1:
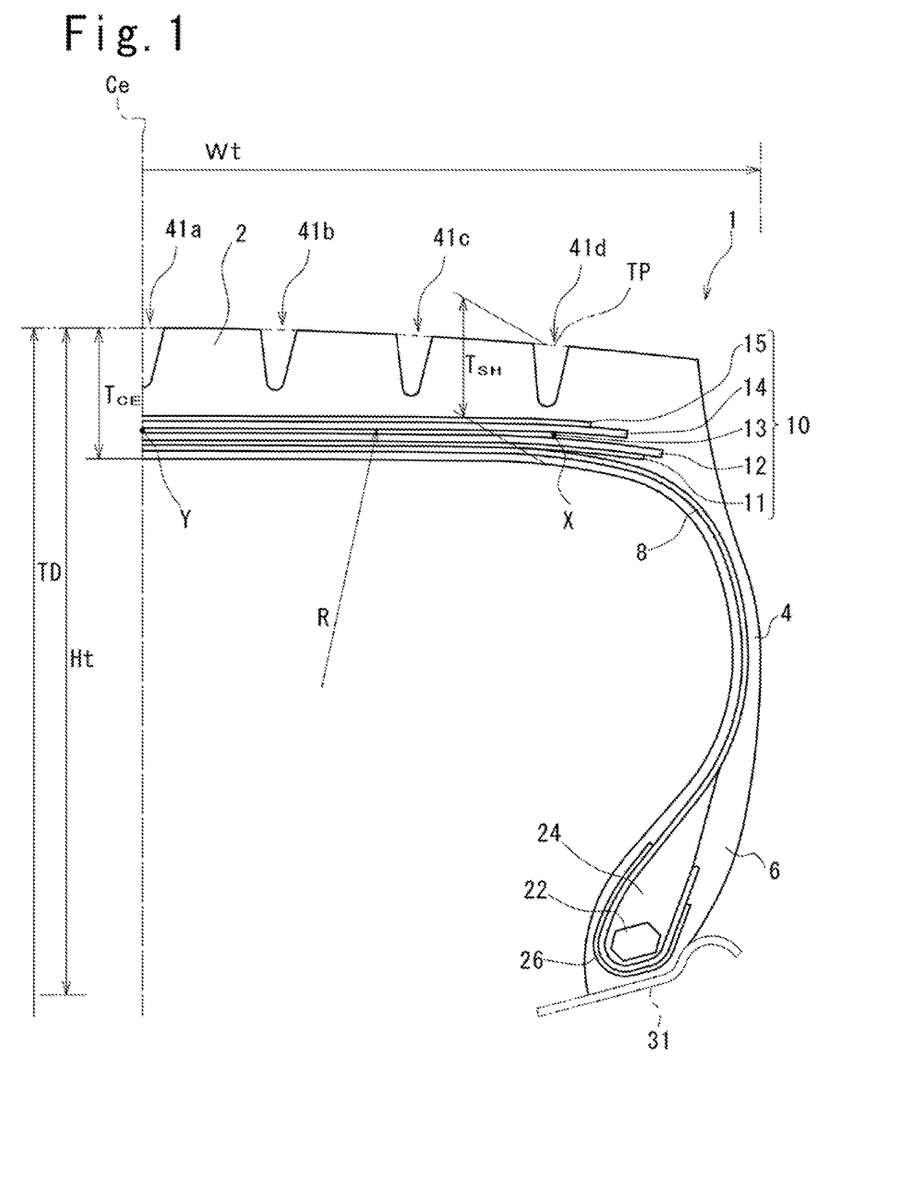
FIG. 1 is a meridian sectional view of a pneumatic tire according to an embodiment of the present invention.

FIG. 1 shows a rubber pneumatic tire (hereinafter referred to as "tire") 1 according to an embodiment of the present invention. The tire 1 is a pneumatic radial tire for a heavy load used for a vehicle such as a truck or a bus. Further, the tire 1 is a low-profile tire having an aspect ratio of not larger than 70%. An aspect ratio is defined as a ratio of a maximum tire-section height Ht to a maximum tire-section width Wt. Specifically, a size of the tire 1 in this embodiment is 445/50R22.5 (expressed in accordance with ISO standard).

In FIG. 1, the tire 1 is mounted on a predetermined rim 31 and is filled with a minute internal pressure. Herein, the minute internal pressure refers to an internal pressure at least required for holding the shape of the tire 1 mounted on the rim 31, and ranges from 40 kPa to 60 kPa. In the present embodiment, the minute internal pressure is set at 50 kPa.

The tire 1 includes a tread portion 2, a pair of side portions 4, and a pair of bead portions 6. The bead portions 6 are respectively formed on inner edge portions of the side portions 4 in a tire-radial direction (edge portions of the side portions 4 opposite to the tread portion 2). A carcass 8 is arranged between the pair of bead portions 6. An inner liner (not shown in the drawing) is arranged in an innermost peripheral surface of the tire 1. A belt layer 10 is arranged between the carcass 8 and a tread surface of the tread portion 2. In other words, in the tread portion 2, the belt layer 10 is arranged at an outer side of the carcass 8 in the tire-radial direction. As described later in detail, in this embodiment, the belt layer 10 includes five belts 11 to 15.

The tread portion 2 has a plurality of main grooves 41 each extending in a tire-circumferential direction. The number of main grooves 41 is seven, one of which is on a center in a tire-width direction (Ce in FIG. 1 denotes a center line in a tire-width direction) and the remaining ones of which are on both sides of the center. The main groove on the center line Ce is referred to as a first main groove 41a. The main grooves on the outer sides of the first main groove 41a are referred to as second main grooves 41b. The main grooves on the outer sides of the second main grooves 41b are referred to as third main grooves 41c. The main grooves on the outermost sides in the tire-width direction are referred to as shoulder main grooves 41d. The main grooves 41a to 41d form a plurality of land portions of the tread portion 2.

The tread portion 2 has a tread profile TP defined such that a tire-outer diameter TD gradually decreases from a tire-equatorial plane (i.e., the center line Ce) toward both ends in the tire-width direction. Herein, the tread profile TP refers to the outline (surface profile) of the tread portion 2 in section (meridian section) taken in the tire-width direction and tire-radial direction. However, the tread profile TP refers to the contour of the tread portion 2 in a supposed case where the tread portion 2 has no groove formed therein, and corresponds to a smooth curve connecting tread surfaces (i.e., surfaces of the respective land portions).

A thickness of the tread portion 2, that is, a total thickness from the tread profile TP to a tire-inner peripheral surface (i.e., an inner peripheral surface of an inner liner) is set such that a total thickness $T_{CE}$ on the tire-equatorial plane is larger than a total thickness $T_{SH}$ at the shoulder main groove 41d. The total thickness at the shoulder main groove 41d refers to a thickness from the tread profile TP, that is, the smooth curve connecting the land portions divided by the shoulder main groove 41d to the tire-inner peripheral surface at the center of the shoulder main groove 41d in the tire-width direction.

More specifically, the tread portion 2 is formed such that the total thickness $T_{CE}$ on the tire-equatorial plane and the total thickness $T_{SH}$ at the shoulder main groove 41d satisfy a relationship of $1.05T_{SH} \leq T_{CE} \leq 1.35T_{SH}$.

The bead portion 6 includes a bead core 22, a bead filler 24, and a chafer 26. Around the bead core 22, an end portion of the carcass 8 in a tire-width direction is wound up from an inner side to an outer side in a tire-width direction along the bead filler 24. The chafer 26 is arranged around the bead filler 24 so as to be arranged adjacently to an outer side of the end portion of the carcass 8.

Figure 2:
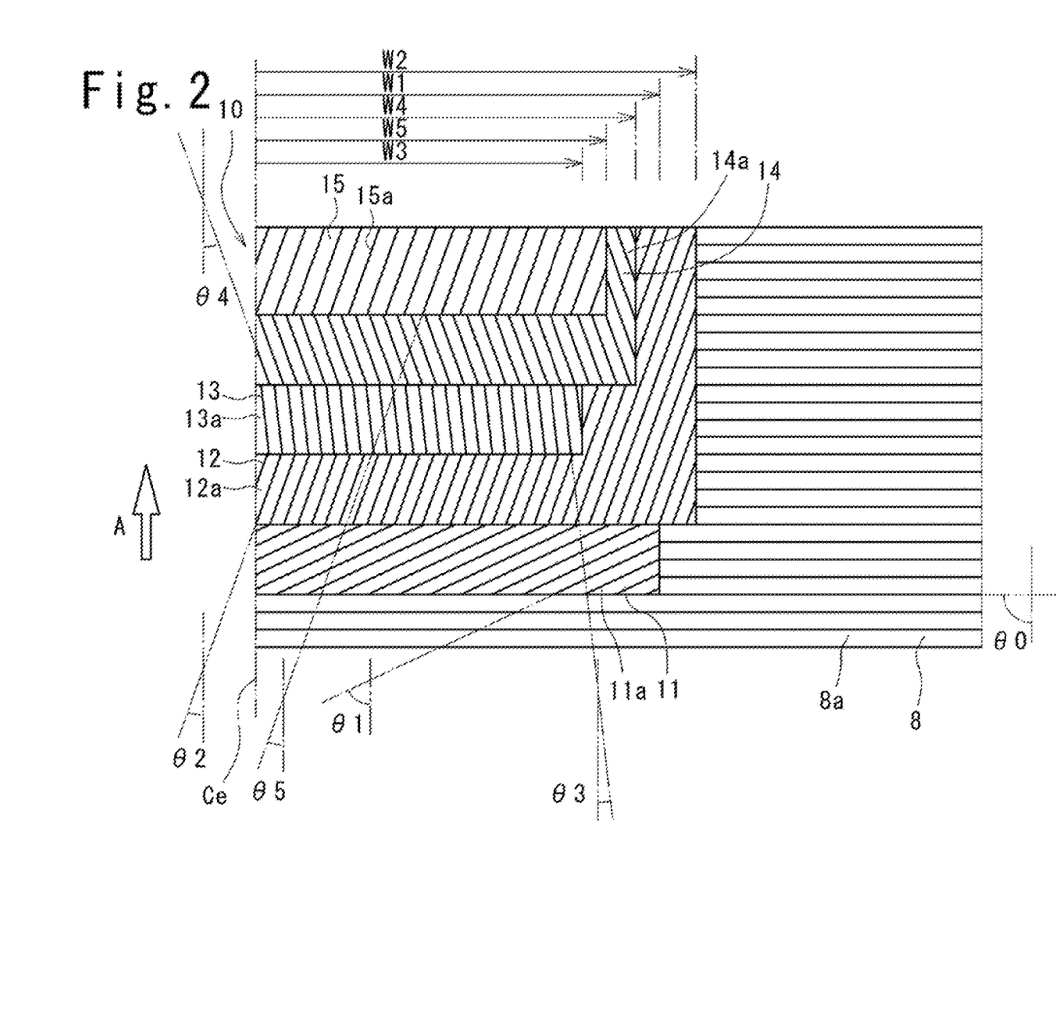
FIG. 2 is a development view of a belt layer.

Referring to FIGS. 1 and 2, the carcass 8 in this embodiment is formed of one carcass ply, and is formed of a plurality of carcass cords 8a arranged parallel to each other and coated by a rubber layer. Each carcass cord 8a is arranged so as to extend in the tire-radial direction, and has an angle θ0 with respect to a tire-circumferential direction (cord angle) set to 90 degrees. In FIGS. 1 and 2, symbol Ce indicates a center line in the tire-width direction. The direction along which the center line Ce extends is a tire-radial direction. While the carcass cord 8a in this embodiment is made of steel, the carcass cord 8a can be made of organic fibers.

Referring to FIGS. 1 and 2, the belt layer 10 in this embodiment includes five belts arranged in an overlapping manner. These belts include a buffer belt 11, a first main working belt 12, a reinforcement belt 13, a second main working belt 14, and a protection belt 15.

The buffer belt 11 is arranged adjacently to an outer side of the carcass 8 in the tire-radial direction. The first main working belt 12 is arranged adjacently to an outer side of the buffer belt 11 in the tire-radial direction. The second main working belt 14 is arranged at an outer side of the first main working belt 12 in the tire-radial direction. The reinforcement belt 13 is arranged between the first main working belt 12 and the second main working belt 14. That is, the reinforcement belt 13 is arranged adjacently to the outer side of the first main working belt 12 in the tire-radial direction, and is also arranged adjacently to an inner side of the second main working belt 14 in the tire-radial direction. The protection belt 15 is arranged adjacently to an outer side of the second main working belt 14 in the tire-radial direction.

Main functions of the first and second main working belts 12 and 14 are to apply a binding force in the tire-radial direction to the carcass 8 (with a cord angle θ0 being set to 90 degrees). A main function of the reinforcement belt 13 is to compensate for the shortage in a binding force in the tire-radial direction which is applied to the tire 1 by the first and second main working belts 12 and 14. A main function of the protection belt 15 is to enhance external damage resistance of the tire 1 by protecting the first and second main working belts 12 and 14. A main function of the buffer belt 11 is to enhance impact resistance of the tire 1.

In the state in which the tire 1 is mounted on the predetermined rim 31 and is filled with the minute internal pressure as illustrated in FIG. 1, the reinforcement belt 13 is arranged such that an arc passing points X on both maximum width positions of the reinforcement belt 13 (FIG. 1 illustrates one of the points X) and a point Y on the tire-equatorial plane (i.e., the center line Ce) in meridian section has a radius of curvature R of not smaller than 2500 mm. The points X on both the maximum width positions and the point Y on the tire-equatorial plane may be points on positions of the same thickness on the reinforcement belt 13, for example, points on an outer peripheral surface of the reinforcement belt 13, points on an inner peripheral surface of the reinforcement belt 13, or points on positions of the same thickness between the outer peripheral surface and the inner peripheral surface. The arc passing the above three points may be bowed outward or inward in the tire-radial direction.

In other words, in the state in which the tire 1 is filled with the minute internal pressure, that is, in an initial state of a growth (inflation), the reinforcement belt 13 can be regarded to have an almost flat meridian sectional shape. In raising from the minute internal pressure to a predetermined internal pressure, therefore, the tire 1 is uniformly grown with ease while the reinforcement belt 13 is held to be almost flat. As a result, the stiffness of the tire 1 in the tire-width direction is uniformly held with ease while a cord angle θ3 and end count of a belt cord 13a in the reinforcement belt 13 are almost uniformly held.

In addition, the relationship of $1.05T_{SH} \leq T_{CE} \leq 1.35T_{SH}$ is satisfied between the total thickness $T_{CE}$ on the tire-equatorial plane and the total thickness $T_{SH}$ at the shoulder main groove 41d. As a result, since the reinforcement belt 13 is almost flat, substantially, the thickness of the tread portion 2 gradually decreases from the tire-center line Ce (the tire-equatorial plane) to the shoulder main groove 41d (the outermost main groove). In other words, the shoulder main groove 41d-side tire diameter is smaller than the tire-center line Ce-side tire diameter. This suppresses the ground contactability of the shoulder main groove 41d-side tread portion 2 which comes into contact with the ground with ease because of the deformation of a side portion of the tire 1 with a load applied thereto. In the state in which a load is applied to the tire 1, thus, the tread portion 2 has a ground contact surface shape which becomes almost uniform from the tire-center line Ce to the shoulder main groove 41d.

Accordingly, even when the cord angle θ3 of the reinforcement belt 13 is not smaller than 6 degrees and not larger than 9 degrees, the tire 1 can be almost uniformly grown (inflated) with ease, and the stiffness of the tire 1 in the tire-width direction can be almost uniformly held. Moreover, since the tire 1 has the ground contact surface shape which becomes almost uniform from the tire-center line Ce to the shoulder main groove 41d in the tire-width direction, the partial wear resistance of the tread portion 2 can be enhanced.

Each of these belts 11 to 15 of the belt layer 10 is formed of a plurality of belt cords 11a to 15a arranged parallel to each other and coated with rubber.

Referring FIG. 2, inclination angles (cord angles) θ1 to θ5 of the belt cords 11a to 15a of belts 11 to 15 forming the belt layer 10 will be described. In the description hereinafter, regarding the cord angles θ1 to θ5, a direction along which the belt cords 11a to 15a extend rightward and away from the center line Ce in the tire-width direction when an arrow A in FIG. 2 is set as a reference direction can be referred to as "right upward direction". Similarly, a direction along which the belt cords 11a to 15a extend leftward and away from the center line Ce in the tire-width direction when the allow A in FIG. 2 is set as the reference direction can be referred to as "left upward direction".

In this embodiment, the cord angle θ2 of the belt cord 12a of the first main working belt 12 is set to 17 degrees (right upward direction). The cord angle θ2 can be set to any value which falls within a range of 20±10 degrees, and can preferably be set to a value which falls within a range of 17±5 degrees.

In this embodiment, the cord angle θ4 of the belt cord 14a of the second main working belt 14 is set to 17 degrees (left upward direction). The cord angle θ4 can be set to a value which falls within a range of 20±10 degrees, and can preferably be set to a value which falls within a range of 17±5 degrees.

The cord angles θ2 and θ4 of the first and second main working belts 12, 14 are set so that the belt cords 12a and 14a extend in different directions with respect to the center line Ce in the tire-width direction. That is, one of the cord angles θ2 and θ4 is set so that the belt cords extend in the right upward direction, and the other of them is set so that the belt cords extend in the left upward direction.

The cord angle θ3 of the belt cord 13a of the reinforcement belt 13 is set to 7 degrees (left upward direction) in this embodiment. The cord angle θ3 can be set to a value which falls within a range of not smaller than 6 degrees and not larger than 9 degrees.

The cord angle θ1 of the belt cord 11a of the buffer belt 11 is set to 65 degrees in this embodiment. The cord angle θ1 can be set to a value which falls within a range of 60±15 degrees.

The cord angle θ5 of the belt cord 15a of the protection belt 15 is set to 20 degrees in this embodiment. The cord angle θ5 can be set to a value which falls within a range of 20±10 degrees.

Numerical values (including upper and lower limit values of a numerical value range) of the cord angles θ1 to θ5 can include substantially unavoidable errors, and are not necessarily geometrically precise values as long as that functions required for the belts 11 to 15 are satisfied. This is also applied to the cord angle θ0 of the carcass cords 8a.

The cord angles θ1 to θ5 of the belts 11 to 15 can be coordinated as shown in the following Table 1.

TABLE 1

|  | Embodiment | Settable range of angle |
|---|---|---|
| Buffer belt | 65 degrees (right upward direction) | 60 ± 15 degrees (right upward direction) |

TABLE 1-continued

| | Embodiment | Settable range of angle |
|---|---|---|
| First main working belt | 17 degrees (right upward direction) | 20 ± 10 degrees (17 ± 5 degrees) (right upward direction) |
| Reinforcement belt | 7 degrees (left upward direction) | Not smaller than 6 degrees and not larger than 9 degrees |
| Second main working belt | 17 degrees (left upward direction) | 20 ± 10 degrees (17 ± 5 degrees) (left upward direction) |
| Protection belt | 20 degrees (right upward direction) | 20 ± 10 degrees (right upward direction) |

Main data except for the cord angles of the belts 11 to 15 in this embodiment are shown in the following Table 2

TABLE 2

| | Raw material | Diameter of cord (mm) | Thickness of cord including cover rubber (mm) | Number of ends (EPI) | Width (mm) |
|---|---|---|---|---|---|
| Buffer belt | Steel | 1.1 | 1.7 | 12 | W1 = 345 |
| First main working belt | Steel | 1.4 | 2.6 | 12 | W2 = 370 |
| Reinforcement belt | Steel | 1.1 | 1.7 | 12 | W3 = 290 |
| Second main working belt | Steel | 1.4 | 2.6 | 12 | W4 = 325 |
| Protection belt | Steel | 1.1 | 1.9 | 9 | W5 = 295 |

As shown in Table 2, in this embodiment, a width W4 (325 mm) of the second main working belt 14 which is arranged relatively outer side in the tire-radial direction is set narrower than a width W2 (370 mm) of the first main working belt 12 which is arranged relatively inner side in the tire-radial direction.

A width W3 of the reinforcement belt 13 is set to a value equal to or wider than 50% of a maximum tire-section width Wt (W3≥0.5Wt). In this embodiment, the maximum tire-section width Wt is a value set under conditions where the tire 1 is mounted on a predetermined rim (a rim 31 is schematically shown in FIG. 1), the tire 1 is filled with air until an inner pressure reaches a predetermined internal pressure (830 kPa which is an internal pressure determined by the Tire and Rim Association, Inc (TRA)), and the tire 1 is in an unloaded state. The width W3 of the reinforcement belt 13 is set narrower than a width of either one of the first and second main working belts 12 and 14 having a narrower width than the other (W3≤W2, W4). In this embodiment, the width W3 of the reinforcement belt 13 is set to 290 mm. Accordingly, the width W3 of the reinforcement belt 13 is equal to or wider than 50% of a maximum tire-section width Wt (440 mm) under the above-mentioned conditions, and is narrower than the width W4 (325 mm) of the second main working belt 14 having a narrower width.

The cord angle θ3 of the reinforcement belt 13 is set to an angle of not smaller than 6 degrees and not larger than 9 degrees, instead of a small angle of not smaller than 0 degrees to not more than 5 degrees (an angle which can be substantially regarded as 0 degrees or an angle close to 0 degrees). Such configuration can prevent a binding force in a tire-radial direction generated by a reinforcement belt 13 from becoming excessively large, and therefore the excessively large deformation of the tire in the tire-width direction can be suppressed. Since the excessively large deformation of the tire in the tire-width direction can be suppressed, the distortion generated in the bead portion 6 can be suppressed, and therefore bead durability (resistance against the generation of a defect such as separation in the bead portion) can be enhanced.

Figure 3:
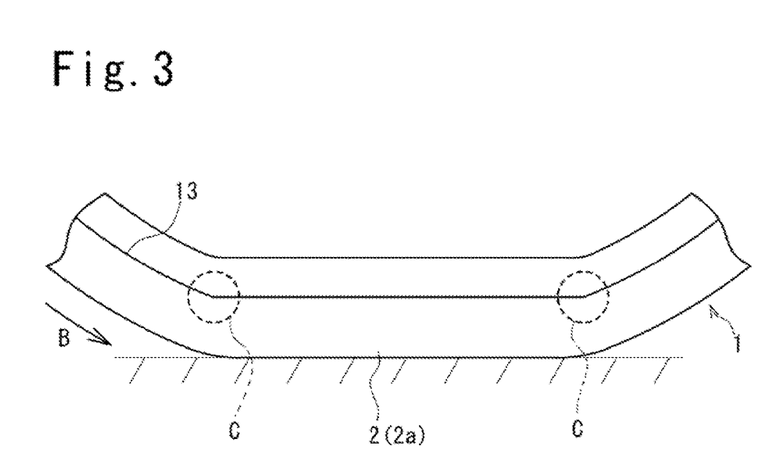
FIG. 3 is a schematic partial sectional view of the pneumatic tire to which a load is applied.

As conceptually shown in FIG. 3, in a loaded state (a state where the tire 1 is mounted on a vehicle), belt cords 13a of the reinforcement belt 13 are bent in regions (symbols C) of a tread surface of the tread portion 2 in front of and behind a road contact surface 2a in the rotational direction of the tire indicated by an arrow B. The smaller cord angle θ3, the more conspicuous the bending of the belt cords 13a becomes. By setting the cord angle θ3 to a value not smaller than 6 degrees and not larger than 9 degrees, compared to a case where the cord angle θ3 is set to a small angle such as an angle not smaller than 0 degrees and not larger than 5 degrees, bending of the belt cord 13a of the reinforcement belt 13 in the vicinity of the road contact surface 2a can be alleviated, and therefore cord breakage can be effectively prevented.

As described above, the width W3 of the reinforcement belt 13 is set narrower than the width W4 of the second main working belt 14 which is narrower one of the first and second main working belts 12, 14. Such configuration can also effectively prevent cord breakage of the belt cord 13a of the reinforcement belt.

As described above, the reinforcement belt 13 is arranged between the first main working belt 12 and the second main working belt 14. Due to such an arrangement, the reinforcement belt 13 is protected by the first and second main working belts 12, 14, and therefore cord breakage of the belt cord 13a of the reinforcement belt 13 caused due to bending of the cord in the vicinity of the road contact surface 2a (symbols C in FIG. 3) can be effectively prevented.

Due to these reasons, cord breakage of the reinforcement belt 13 can be effectively prevented.

By setting the cord angle θ3 of the reinforcement belt 13 to a value not smaller than 6 degrees and not larger than 9 degrees, an effect of suppressing a growth of the tire 1 in the radial direction is reduced compared to the case where the cord angle θ3 is set to a value not smaller than 0 degrees and not larger than 5 degrees. However, the cord angle θ3 of the reinforcement belt 13 is 9 degrees at maximum, and therefore there is no possibility that a binding force in the tire-radial direction is excessively reduced. Further, as described above, the width W3 of the reinforcement belt 13 is equal to or wider than 50% of a maximum tire-section width Wt. That is, a width of the reinforcement belt 13 is not narrow but is sufficiently wide. Due to these reasons, the tire 1 can ensure a required effect of suppressing a growth of the tire 1 in the radial direction. Further, the tire can acquire a which are not described particularly hereinafter are shared in common by the tires according to Comparative Examples 1 to 5 and the tires according to Examples 1 to 4. Particularly, in all of Comparative Examples 1 to 5 and the tires according to Examples 1 to 4, a tire size is set to 445/50R22.5.

TABLE 3

|  | Comparative Example 1 | Comparative Example 2 | Comparative Example 3 | Comparative Example 4 | Comparative Example 5 |
|---|---|---|---|---|---|
| Note | No reinforcement belt (FIG. 5) | Reinforcement belt extending in circumferential direction | Cord angle θ3 excessively small | Cord angle θ3 excessively large | Width W3 excessively small |
| Cord angle θ3 (degrees) of reinforcement belt | — | 0 | 5 | 10 | 7 |
| Width W3 of reinforcement belt (mm) | — | 290 | 290 | 290 | 180 |
| W3/Wt * 100 (%) | — | 66 | 66 | 66 | 41 |
| Belt durability | 100 | 130 | 127 | 105 | 90 |
| Bead durability | 100 | 90 | 100 | 120 | 100 |

|  | Example 1 | Example 2 | Example 3 | Example 4 |
|---|---|---|---|---|
| Note | Cord angle θ3 being lower limit value | Cord angle θ3 being a value close to center value | Cord angle θ3 being upper limit value | Width W3 being lower limit value |
| Cord angle θ3 (degrees) of reinforcement belt | 6 | 7 | 9 | 7 |
| Width W3 of reinforcement belt | 290 | 290 | 290 | 220 |
| W3/Wt * 100 (%) | 66 | 66 | 66 | 50 |
| Belt durability | 123 | 120 | 110 | 110 |
| Bead durability | 110 | 115 | 120 | 105 | sufficient force for holding a shape of the tread portion 2 so that distortion at the end portion of the belt can be reduced whereby the tire can ensure required belt durability. The width W3 of the reinforcement belt 13 is narrower than a width of the narrower one of the first and second main working belts 12 and 14 (widths W2, W4). Accordingly, the distortion generated in the reinforcement belt 13 can be reduced.

As described above, according to the tire 1 of the present embodiment, bead durability and belt durability can be enhanced while an effect of suppressing a growth of the tire 1 in the radial direction and belt durability are also ensured.

Figure 4:
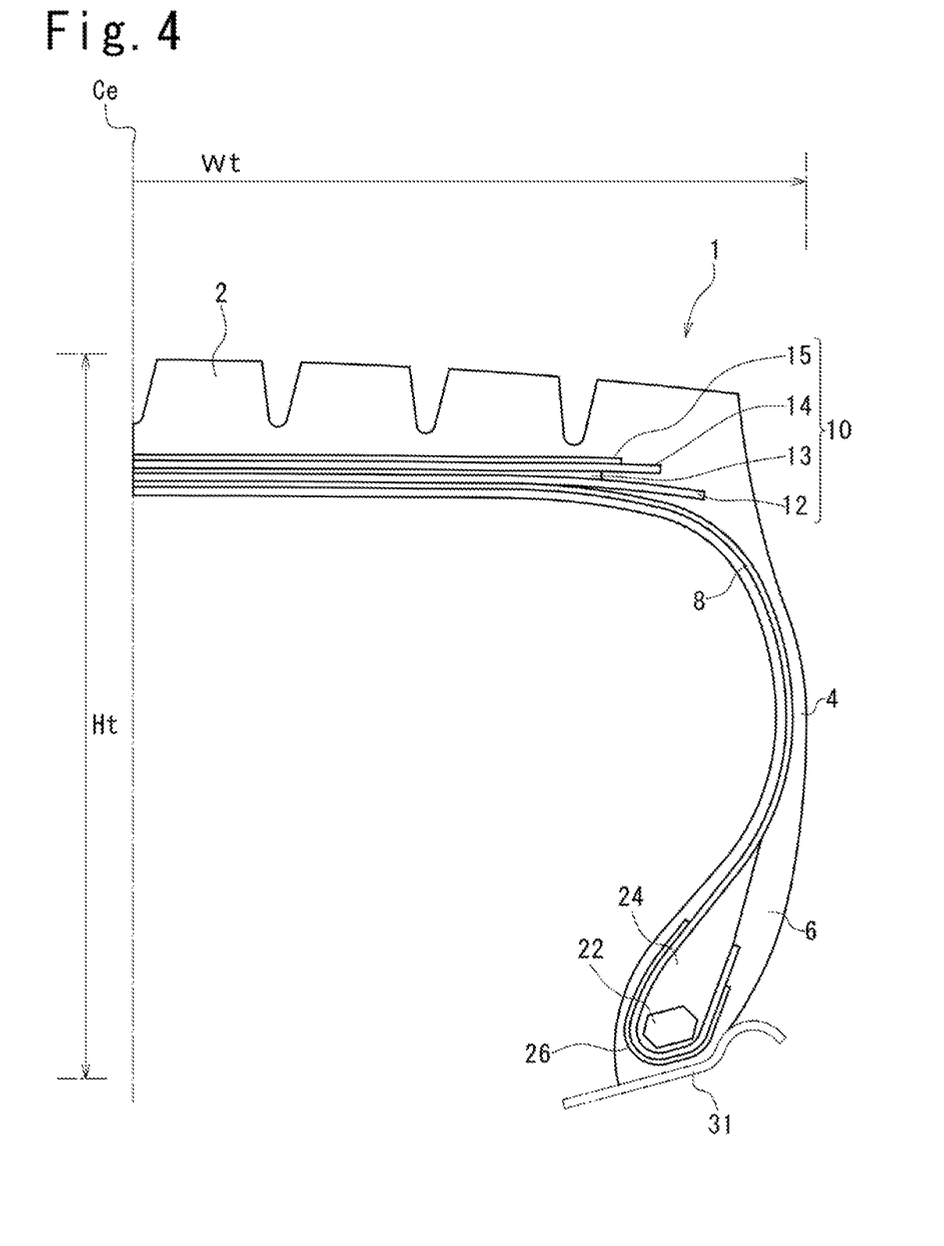
FIG. 4 is a meridian sectional view of a pneumatic tire according to a modification.

FIG. 4 shows a modification of the tire 1 according to the embodiment. In this modification, a belt layer 10 includes four belts, that is, a first main working belt 12, a reinforcement belt 13, a second main working belt 14, and a protection belt 15, but does not include a buffer belt 11. Even in the case where the belt layer 10 does not include the buffer belt 11, bead durability can be enhanced while an effect of suppressing a growth of the tire 1 in the radial direction and belt durability are also ensured.

Embodiment 1

Tires according to Comparative Examples 1 to 5 and tires according to Examples 1 to 4 shown in the following Table 3 were subjected to an evaluation test performed for evaluating belt durability and bead durability. Assume that data A belt layer 10 according to Comparative Example 1 shown in FIG. 5 does not include a reinforcement belt 13, but includes a buffer belt 11, a first main working belt 12, a second main working belt 14, and a protection belt 15.

In the tire according to Comparative Example 2, a cord angle θ3 of a reinforcement belt 13 is set to 0 degrees, which is smaller than a lower limit value of a range of a cord angle θ3 (not smaller than 6 degrees and not larger than 9 degrees) in the present invention.

In the tire according to Comparative Example 3, a cord angle θ3 of a reinforcement belt 13 is set to 5 degrees, which is smaller than the lower limit value of the range of the cord angle θ3 (not smaller than 6 degrees and not larger than 9 degrees) in the present invention.

In the tire of Comparative Example 4, a cord angle θ3 according to a reinforcement belt 13 is set to 10 degrees, which is larger than an upper limit value of the range of the cord angle θ3 (not smaller than 6 degrees and not larger than 9 degrees) in the present invention.

In the tire according to Comparative Example 5, a width W3 of a reinforcement belt 13 is set to 180 mm. A tire 1 is mounted on a predetermined rim, the tire is filled with air until a tire internal pressure reaches a predetermined internal pressure, and a maximum tire-section width in an unloaded state is set to 440 mm. Accordingly, in Comparative Example 5, a ratio of the width W3 of the reinforcement belt 13 to a maximum tire section width Wt is 41%. Accordingly, the width W3 of the reinforcement belt 13 according to Comparative Example 5 is narrower than a lower limit value of a width W3 of the reinforcement belt 13 (W3=0.5Wt) in the present invention.

In the tire of Example 1, a cord angle θ3 of a reinforcement belt 13 is set to 6 degrees, which is the lower limit value of the range of the cord angle θ3 (not smaller than 6 degrees and not larger than 9 degrees) in the present invention.

In the tire according to Example 2, a cord angle θ3 of a reinforcement belt 13 is set to 7 degrees, which is a value close to a center value of the range of the cord angle θ3 (not smaller than 6 degrees and not larger than 9 degrees) in the present invention.

In the tire according to Example 3, a cord angle θ3 of a reinforcement belt 13 is set to 9 degrees, which is the upper limit value of the range of the cord angle θ3 (not smaller than 6 degrees and not larger than 9 degrees) in the present invention.

In the tire according to Example 4, a width W3 of a reinforcement belt 13 is set to 220 mm. As described later, a maximum tire-section width under the conditions of the evaluation test is set to 440 mm. Accordingly, a ratio of the width W3 of the reinforcement belt 13 in Example 4 to the maximum tire-section width Wt is 50%. That is, the width W3 of the reinforcement belt 13 in Example 4 is a lower limit value of the width W3 of the reinforcement belt 13 (W3=0.5Wt) in the present invention.

In this evaluation test, belt durability and bead durability are evaluated.

In evaluating belt durability, each tire has a tire size of 445/50R22.5, the tire is mounted on a wheel having a rim size of 22.5×14.00 (specified rim), and the tire is filled with air having a pressure of 930 kPa (a value obtained by adding 100 kPa to 830 kPa which is an internal pressure determined by TRA). Each tire mounted on the wheel is mounted on a drum tester, and a traveling test is performed under conditions where a speed is set to 40 km/h and a load is set to 54.4 kN. In such a case, traveling distances of respective tires before the tires are broken are expressed as indexes respectively as shown in Table 3.

In evaluating bead durability, each tire has a tire size of 445/50R22.5, the tire was mounted on a wheel having a rim size of 22.5×14.00 (specified rim), and the tire was filled with air having a pressure of 900 kPa (a value obtained by adding 70 kPa to 830 kPa which is an internal pressure specified by TRA). Each tire mounted on the wheel was mounted on a drum tester, and a traveling test was performed under conditions where a speed is set to 40 km/h and a load is set to 72.5 kN. In such a case, traveling distances of respective tires before the tires were broken are expressed as indexes respectively as shown in Table 3.

An internal pressure of air filled in the tire and a load applied to the tire differ between the evaluation of belt durability and the evaluation of bead durability. The reason is that the condition that distortion is liable to be generated in the belt layer 10 is adopted in the evaluation of belt durability, while the condition that distortion is liable to be generated in the bead portion 6 is adopted in evaluation of bead durability.

In both belt durability and bead durability, assuming the performance of the tire according to Comparative Example 1 as 100, performances of tires according to the remaining Comparative Examples 2 to 5 and Examples 1 to 4 are indexed.

In all Examples 1 to 4, the indexes of belt durability are not smaller than 110, showing that all tires have favorable belt durability. In all Examples 1 to 4, indexes of bead durability are not smaller than 105, showing that the tires can have favorable bead durability.

In the tires according to Comparative Examples 2 and 3 where the cord angles θ3 of the reinforcement belt 13 are lower than a lower limit value of the range of the cord angle θ3 (not smaller than 6 degrees and not larger than 9 degrees) in the present invention, although indexes of belt durability exceed 110, indexes of bead durability are lower than 105. That is, in the case where a cord angle θ3 of a reinforcement belt 13 is set to an angle smaller than a value which falls within the range of the cord angle θ3 according to the present invention, even when a tire has the same belt durability as the tires according to Examples 1 to 4, the tire cannot acquire sufficient bead durability.

In the tire according to Comparative Example 4 where the cord angle θ3 of the reinforcement belt 13 exceeds the upper limit value of the range of the cord angle θ3 (not smaller than 6 degrees and not larger than 9 degrees) of the present invention, although an index of bead durability exceeds 105, an index of belt durability is lower than 110. That is, in the case where the cord angle θ3 of the reinforcement belt 13 is set to an angle larger than a value which falls within the range of the present invention, even when a tire has the same bead durability as the tires of Examples 1 to 4, the tire cannot acquire sufficient belt durability.

In the tire according to Comparative Example 5 where a ratio of a width W3 of the reinforcement belt 13 to a maximum tire-section width Wt is lower than the lower limit value of the range (equal to or wider than 50% of maximum tire-section width) in the present invention, an index of bead durability is lower than 105, and an index of belt durability is lower than 110. That is, when the width W3 of the reinforcement belt 13 is narrower than a value which falls within the range of the present invention, the tire cannot acquire sufficient bead durability and sufficient belt durability.

As described above, by comparing the tires according to Comparative Examples 1 to 5 and the tires according to Examples 1 to 4, it is understood that, according to the present invention, bead durability can be enhanced while belt durability in the pneumatic tire is also ensured.

Embodiment 2

An evaluation test was performed on tires according to Comparative Examples 11 to 16 and Examples 11 to 15 shown in Table 4 in order to evaluate the partial wear resistance and belt durability of each tread portion. The following comparative examples and working examples have commonalities with regard to data which are not particularly mentioned in the following description. Particularly, all the following comparative examples and working examples employ a tire with a size of 445/50R22.5. Except Comparative Example 12, the cord angle θ3 of reinforcement belt 13 is 7 degrees. The radius of curvature R of the reinforcement belt 13 in Table 4 shows a radius of curvature of an arc passing points on both the maximum width positions and a point on the tire-equatorial plane of the reinforcement belt 13 in the state in which the tire 1 mounted on the predetermined rim 31 is filled with a minute internal pressure (herein, 50 kPa). Moreover, an arc bowed outward is represented by a positive number whereas an arc bowed inward is represented by a negative number.

TABLE 4

|  | Comparative Example 11 | Comparative Example 12 | Comparative Example 13 | Comparative Example 14 | Comparative Example 15 | Comparative Example 16 |
|---|---|---|---|---|---|---|
| Remarks | No reinforcement belt (FIG. 5) | Reinforcement belt in circumferential direction | Excessively small radius of curvature (bowed outward) | Excessively small radius of curvature (bowed inward) | Excessively small $T_{CE}/T_{SH}$ | Excessively large $T_{CE}/T_{SH}$ |
| Presence/absence of reinforcement belt | Absence | Presence | Presence | Presence | Presence | Presence |
| Cord angle θ3 of reinforcement belt (deg.) | — | 0 | 7 | 7 | 7 | 7 |
| Radius of curvature R of reinforcement belt (mm) | — | 2000 | 2000 | −2000 | 5000 | 5000 |
| $T_{CE}/T_{SH}$ | 1.00 | 1.00 | 1.20 | 1.20 | 1.00 | 1.40 |
| Partial wear resistance (Sh/Ce) | 100 | 90 | 85 | 84 | 88 | 113 |
| Belt durability | 100 | 130 | 125 | 123 | 130 | 130 |

|  | Example 11 | Example 12 | Example 13 | Example 14 | Example 15 |
|---|---|---|---|---|---|
| Remarks |  | Radius of curvature is lower limit value (bowed outward) | Radius of curvature is lower limit value (bowed inward) | $T_{CE}/T_{SH}$ is close to lower limit value | $T_{CE}/T_{SH}$ is close to upper limit value |
| Presence/absence of reinforcement belt | Presence | Presence | Presence | Presence | Presence |
| Cord angle θ3 of reinforcement belt (deg.) | 7 | 7 | 7 | 7 | 7 |
| Radius of curvature R of reinforcement belt (mm) | 5000 | 2500 | −2500 | 5000 | 5000 |
| $T_{CE}/T_{SH}$ | 1.20 | 1.20 | 1.20 | 1.10 | 1.30 |
| Partial wear resistance (Sh/Ce) | 101 | 92 | 91 | 92 | 108 |
| Belt durability | 130 | 128 | 127 | 130 | 130 |

Figure 5:
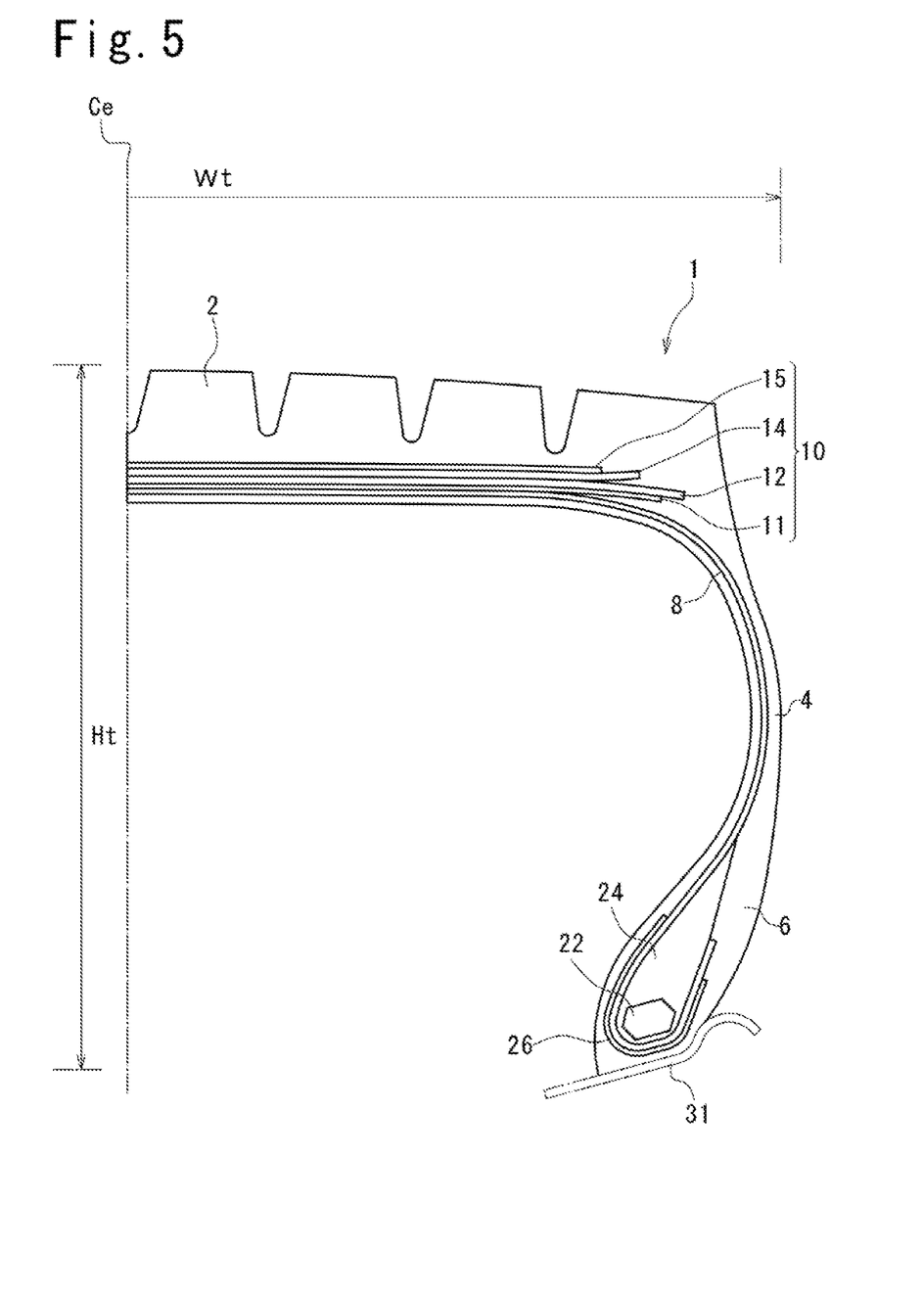
FIG. 5 is a meridian sectional view of a pneumatic tire according to Comparative Example 1.

As illustrated in FIG. 5, a belt layer 10 in Comparative Example 11 does not include the reinforcement belt 13, but includes a buffer belt 11, a first main working belt 12, a second main working belt 14, and a protection belt 15.

In Comparative Example 12, the cord angle θ3 of the reinforcement belt 13 is 0 degrees. The radius of curvature R of the reinforcement belt 13 is 2000 mm which is smaller than the lower limit value of the present invention, and the arc is bowed outward. The ratio $T_{CE}/T_{SH}$ of the total thickness $T_{CE}$ on the tire-equatorial plane to the total thickness $T_{SH}$ at the shoulder main groove 41d is 1.00 which is smaller than the lower limit value of the present invention.

In Comparative Example 13, the cord angle θ3 of the reinforcement belt 13 is 7 degrees. The radius of curvature R of the reinforcement belt 13 is 2000 mm which is smaller than the lower limit value of the present invention, and the arc is bowed outward. The ratio $T_{CE}/T_{SH}$ of the total thickness $T_{CE}$ on the tire-equatorial plane to the total thickness $T_{SH}$ at the shoulder main groove 41d is 1.20 which is close to the center value of the present invention. In Comparative Examples 14 to 16 and Examples 11 to 15, the cord angle θ3 of the reinforcement belt 13 is 7 degrees unless otherwise specified.

In Comparative Example 14, the radius of curvature R is −2000 mm which is smaller than the lower limit value of the present invention, and the arc is bowed inward. The ratio $T_{CE}/T_{SH}$ of the total thickness $T_{CE}$ on the tire-equatorial plane to the total thickness $T_{SH}$ at the shoulder main groove 41d is 1.20 which is close to the center value of the present invention.

In Comparative Example 15, the radius of curvature R is 5000 mm which falls within the range of the present invention, and the arc is bowed outward. The ratio $T_{CE}/T_{SH}$ of the total thickness $T_{CE}$ on the tire-equatorial plane to the total thickness $T_{SH}$ at the shoulder main groove 41d is 1.00 which is smaller than the lower limit value of the present invention.

In Comparative Example 16, the radius of curvature R is 5000 mm which falls within the range of the present invention, and the arc is bowed outward. The ratio $T_{CE}/T_{SH}$ of the total thickness $T_{CE}$ on the tire-equatorial plane to the total thickness $T_{SH}$ at the shoulder main groove 41d is 1.40 which is larger than the upper limit value of the present invention.

In Example 11, the radius of curvature R is 5000 mm which falls within the range of the present invention, and the arc is bowed outward. The ratio $T_{CE}/T_{SH}$ of the total thickness $T_{CE}$ on the tire-equatorial plane to the total thickness $T_{SH}$ at the shoulder main groove 41d is 1.20 which is close to the center value of the present invention.

In Example 12, the radius of curvature R is 2500 mm which is the lower limit value of the present invention, and the arc is bowed outward. The ratio $T_{CE}/T_{SH}$ of the total thickness $T_{CE}$ on the tire-equatorial plane to the total thickness $T_{SH}$ at the shoulder main groove 41d is 1.20 which is close to the center value of the present invention.

In Example 13, the radius of curvature R is −2500 mm which is the lower limit value of the present invention, and the arc is bowed inward. The ratio $T_{CE}/T_{SH}$ of the total thickness $T_{CE}$ on the tire-equatorial plane to the total thickness $T_{SH}$ at the shoulder main groove 41*d* is 1.20 which is close to the center value of the present invention.

In Example 14, the radius of curvature R is 5000 mm which falls within the range of the present invention, and the arc is bowed outward. The ratio $T_{CE}/T_{SH}$ of the total thickness $T_{CE}$ on the tire-equatorial plane to the total thickness $T_{SH}$ at the shoulder main groove 41*d* is 1.10 which is close to the lower limit value of the present invention.

In Example 15, the radius of curvature R is 5000 mm which falls within the range of the present invention, and the arc is bowed outward. The ratio $T_{CE}/T_{SH}$ of the total thickness $T_{CE}$ on the tire-equatorial plane to the total thickness $T_{SH}$ at the shoulder main groove 41*d* is 1.30 which is close to the upper limit value of the present invention.

This evaluation test was performed for evaluating partial wear resistance and belt durability.

In evaluating partial wear resistance, each tire has a tire size of 445/50R22.5, the tire is mounted on a wheel having a rim size of 22.5×14.00 (predetermined rim), and the tire is filled with air having a pressure of 830 kPa (an internal pressure determined by TRA). A traveling test is performed under conditions where a speed is set to 80 km/h and a load is set to 4625 kg (TRA100% load). A ratio of wear energy acted on a center line Ce-side block and wear energy acted on a shoulder-side block was expressed as an index. The evaluation on belt durability is similar to that described above.

In both the partial wear resistance and belt durability of the tread portion, assuming the performance of the tire according to Comparative Example 11 as 100, the performances of the tires according to Comparative Examples 12 to 16 and Examples 11 to 15 are indexed. With regard to the partial wear resistance, each tire is less susceptible to partial wear in an index range from 90 to 110 and is therefore excellent in partial wear resistance. An index of less than 100 indicates that the center line Ce-side block is larger in degree of wear than the shoulder-side block. On the other hand, an index of more than 100 indicates that the shoulder-side block is larger in degree of wear than the center line Ce-side block. When the index is not larger than 90 or not smaller than 110, such a tire is considerably subjected to partial wear, and this state can be determined as inappropriate on tire performance. With regard to belt durability, an index of less than 100 indicates that the tire is inappropriate on tire performance. As the numeric value is larger, such a tire is excellent in belt durability.

Comparative Examples 12 to 16 are superior in belt durability to Comparative Example 11 owing to the addition of the reinforcement belt 13, but result in inappropriate partial wear resistance.

In Comparative Examples 12 to 14, the radius of curvature R of the reinforcement belt 13 falls below the range (not smaller than 2500 mm) of the present invention. The index of the belt durability is more than 110, but the index of the partial wear resistance is not larger than 90. More specifically, partial wear occurs such that the center line Ce-side block is larger in degree of wear than the shoulder-side block.

This shows that in the state in which the tire is filled with the minute internal pressure, the radius of curvature R of the reinforcement belt 13 falls below the range of the present invention. Therefore, the tire is not uniformly grown under the predetermined internal pressure, resulting in variations of the cord angle and end count and also resulting in ununiform distribution of stiffness in the tire-width direction. In addition, the ratio $T_{CE}/T_{SH}$ of the total thickness $T_{CE}$ on the tire-equatorial plane to the total thickness $T_{SH}$ at the shoulder main groove 41*d* is 1.0, which improves the ground contactability of the shoulder-side block, but lowers the ground contactability of the center line Ce-side block. Thus, a skid occurs at the center line Ce-side block with ease. This partially wears the center line Ce-side block.

In Comparative Examples 15, 16, the radius of curvature R of the reinforcement belt 13 falls within the range (not smaller than 2500 mm) of the present invention. However, the ratio $T_{CE}/T_{SH}$ of the total thickness $T_{CE}$ on the tire-equatorial plane to the total thickness $T_{SH}$ at the shoulder main groove 41*d* does not fall within the range ($1.05 \leq T_{CE}/T_{SH} \leq 1.35$) of the present invention. The index of the belt durability is more than 110, but the index of the wear resistance is not larger than 90 or not smaller than 110.

In Comparative Example 15, the ratio $T_{CE}/T_{SH}$ falls below the lower limit value 1.05 of the present invention so that the total thickness $T_{SH}$ at the shoulder main groove 41*d* becomes excessively large, which improves the ground contactability of the shoulder main groove 41*d*-side block, but lowers the ground contactability of the center line Ce-side block. Thus, a skid occurs at the center line Ce-side block with ease. This partially wears the center line Ce-side block. In Comparative Example 16, on the other hand, the ratio $T_{CE}/T_{SH}$ is more than the upper limit value 1.35 of the present invention so that the total thickness $T_{SH}$ at the shoulder main groove 41*d* becomes excessively small, which lowers the ground contactability of the shoulder main groove 41*d*-side block. Thus, a skid occurs at the shoulder main groove 41*d*-side block with ease. This partially wears the shoulder main groove 41*d*-side block.

In contrast to this, in Examples 12, 13, the radius of curvature R is the lower limit value (2500 mm) of the present invention and is larger than the radius of curvature R (2000 mm) in Comparative Examples 13, 14. Therefore, the reinforcement belt 13 becomes almost flat in the state in which the tire is filled with the minute internal pressure. Thus, when the tire is grown (inflated) with a predetermined internal pressure applied thereto, the tire is uniformly grown while the angle and end count of the belt cord 13*a* are uniformly held. This facilitates uniform distribution of the stiffness of the tire in the tire-width direction. In addition, the ratio $T_{CE}/T_{SH}$ is 1.2 which is close to the center value of the present invention. Therefore, the tire can be uniformly brought into contact with the ground from the center line Ce-side block to the shoulder main groove 41*d*-side block.

It is understood from the comparison among Comparative Examples 13, 14 and Examples 12, 13 that the case where the arc is bowed outward is superior in partial wear resistance and belt durability to the case where the arc is bowed inward, with regard to the radius of curvature R of the reinforcement belt 13.

In each of Comparative Examples 13, 14 and Examples 12, 13, the ratio $T_{CE}/T_{SH}$ is set to 1.20. Therefore, the shoulder main groove 41*d*-side tire diameter is smaller in tread profile TP than the center line Ce-side tire diameter in a ground non-contact state (a state in which no load is applied to the tire) illustrated in FIG. 6A. In a ground contact state (in a state in which a load is applied to the tire) illustrated in FIG. 6B, on the other hand, the tire 1 comes into contact with the ground from the center line Ce-side block to the shoulder main groove 41*d*-side block. In the ground contact state, the reinforcement belt 13 becomes deformed outward in the radial direction on the side of the shoulder main groove 41*d* (such that the shoulder main groove 41*d*-side tire diameter comes close to the center line Ce-side tire diameter). Thus, the reinforcement belt 13 has the radius of curvature R such that the arc is bowed inward.

Figure 6A:
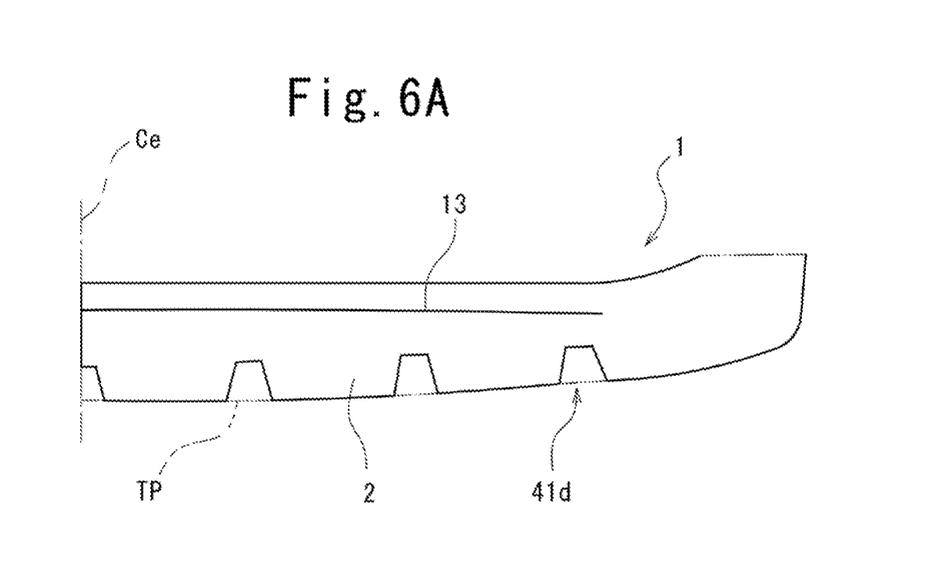
FIG. 6A and FIG. 6B are meridian sectional views of the pneumatic tire to which a load is applied.
Figure 6B:
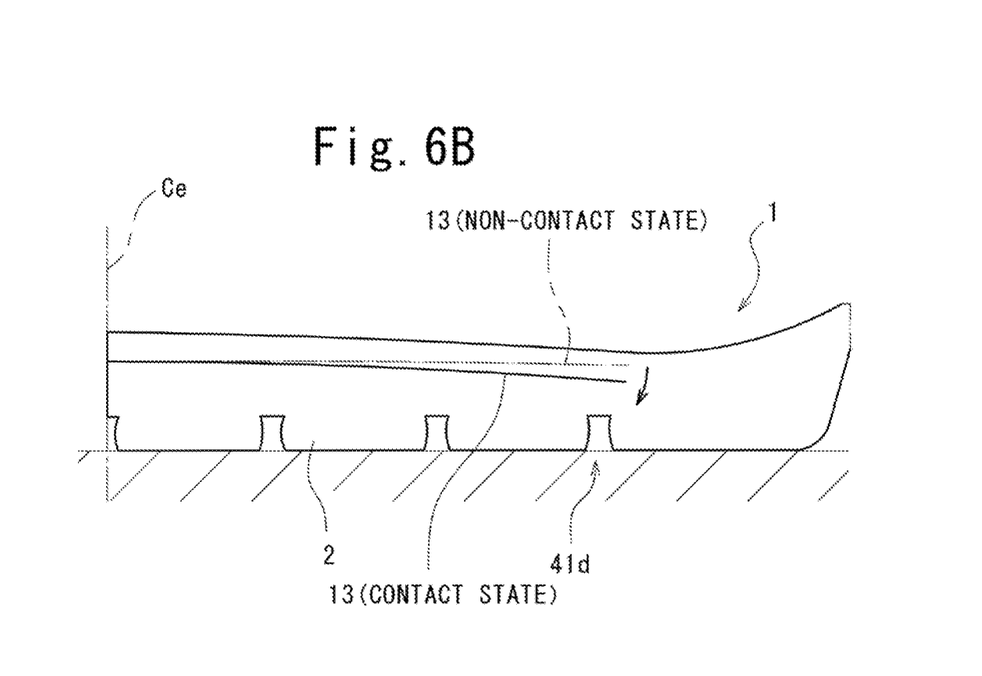

In this case, when the reinforcement belt 13 has an almost flat meridian sectional shape in the ground contact state, the distribution of stiffness in the tire-width direction can be uniformly held. Therefore, the ground contact pressure can be uniformly held in the tire-width direction with ease. Accordingly, in the case where the arc is bowed outward in the ground non-contact state, even when the reinforcement belt 13 becomes deformed outward in the tire-radial direction on the side of the shoulder main groove 41d in the ground contact state, the degree of arc bowed inward is small as a whole. Therefore, the distribution of stiffness in the tire-width direction is almost uniformly held with ease in the ground contact state.

On the other hand, if the arc is bowed inward in the ground non-contact state, the reinforcement belt 13 becomes deformed outward in the tire-radial direction on the side of the shoulder main groove 41d in the ground contact state, so that the degree of the arc further bowed inward as a whole becomes large. Therefore, the distribution of stiffness in the tire-width direction changes with ease in the ground contact state. Hence, the arc bowed outward is superior to the arc bowed inward in terms of partial wear resistance and belt durability since the distribution of stiffness in the tire-width direction is uniformly held with ease in the ground contact state.

In Examples 14, 15, the ratio $T_{CE}/T_{SH}$ falls within the range ($1.05 \leq T_{CE}/T_{SH} \leq 1.35$) of the present invention, and the total thickness falls within the appropriate range. Therefore, the ground contact surface of the tread portion 2 becomes uniform, leading to excellent partial wear resistance and belt durability.

In Example 14, the ratio $T_{CE}/T_{SH}$ is close to the lower limit value of the present invention. In Example 14, the ground contactability of the shoulder main groove 41d-side block is slightly enhanced whereas the ground contactability of the center line Ce-side block is slightly lowered. However, since the ratio $T_{CE}/T_{SH}$ falls within the range of the present invention, the ground contactability of the center line Ce-side block is not excessively lowered, so that the center-side block does not undergo partial wear. In Example 15, on the other hand, the ratio $T_{CE}/T_{SH}$ is close to the upper limit value of the present invention. In Example 15, the ground contactability of the shoulder main groove 41d-side block is slightly lowered, but is not excessively lowered. As a result, the shoulder main groove 41d-side block does not undergo partial wear.

Accordingly, if the cord angle θ3 of the reinforcement belt 13 is set to a value of not smaller than 6 degrees and not larger than 9 degrees, the bead durability can be enhanced, but the growth in the tire-radial direction cannot be suppressed so much as compared with a circumferential belt (θ3=0), which is apt to cause ununiform stiffness in the tire-width direction. In the state in which the tire 1 mounted on the predetermined rim 31 is filled with the minute internal pressure, however, when the reinforcement belt 13 is arranged such that the radius of curvature R is not smaller than 2500 mm and the ratio of the total thickness $T_{CE}$ on the tire-equatorial plane to the total thickness $T_{SH}$ at the shoulder main groove 41d is $1.05 \leq T_{CE}/T_{SH} \leq 1.35$, the tire 1 filled with the predetermined internal pressure can be uniformly grown. Moreover, the distribution of stiffness in the tire-width direction can be uniformly held, and the tire 1 can be almost uniformly brought into contact with the ground from the center line Ce-side block to the shoulder main groove 41d-side block in the state in which a load is applied to the tire 1, leading to favorable partial wear resistance.

In the above embodiment, in the state in which the tire 1 mounted on the predetermined rim 31 is filled with the minute internal pressure, the ratio $T_{CE}/T_{SH}$ of the total thickness $T_{CE}$ on the tire-equatorial plane to the total thickness $T_{SH}$ at the shoulder main groove 41d is determined for the almost flat reinforcement belt 13 to set the shoulder main groove 41d-side tire diameter smaller than the center line Ce-side tire diameter. However, the tread profile TP may be set to gradually decrease outward in the tire-width direction from the tire-equatorial plane.

Figures 7A, 7B, 7C, 7D:
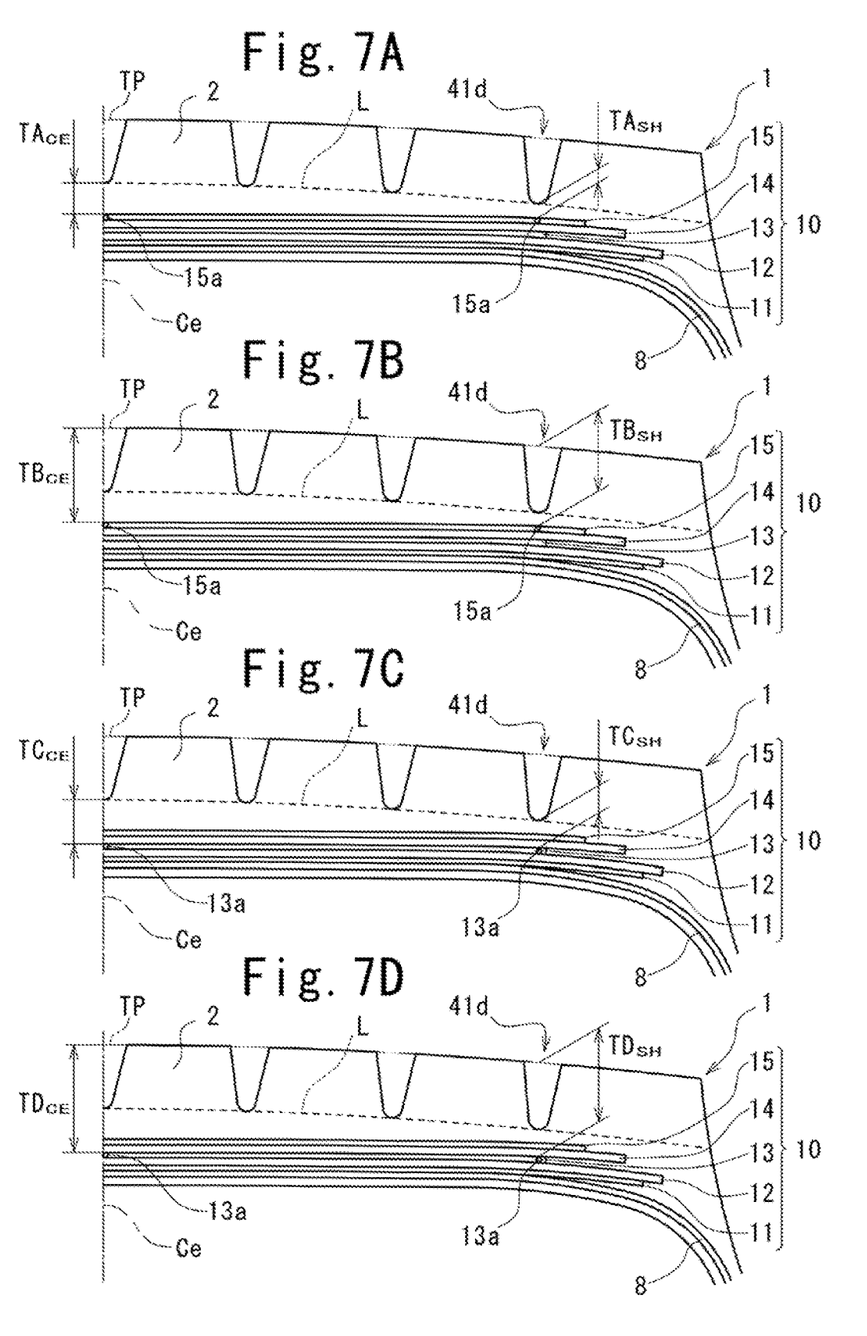
FIGS. 7A to 7D are meridian sectional views of the pneumatic tire, each illustrating a position for determining a thickness of a tread portion.

In addition to or in place of the determination using the total thickness, accordingly, as illustrated in FIG. 7A, a length TA from a groove bottom line L to the belt cord 15a of the protection belt 15 on the outermost diameter position in the belt layer 10 may be determined based on the position of the tire-equatorial plane and the position of the shoulder main groove 41d. In this case, a length $TA_{CE}$ on the tire-equatorial plane and a length $TA_{SH}$ at the shoulder main groove 41d preferably satisfy a relationship of $1.5 \leq TA_{CE}/TA_{SH} \leq 2.5$. The groove bottom line L refers to an imaginary line smoothly connecting the respective bottoms of the main grooves 41a to 41d, which extend in the tire-circumferential direction, in the tire-width direction.

Since the above relationship is satisfied between $TA_{CE}$ and $TA_{SH}$, the partial wear resistance of the tread portion 2 can be enhanced. If $TA_{CE}$ is less than 1.5 times as small as $TA_{SH}$, the center line Ce-side block is hard to come into contact with the ground as compared with the shoulder main groove 41d-side block, so that a skid occurs at the center line Ce-side block. This tends to partially wear the center line Ce-side block. On the other hand, if $TA_{CE}$ is 2.5 times as large as $TA_{SH}$, the shoulder main groove 41d-side block is hard to come into contact with the ground as compared with the center line Ce-side block, so that a skid occurs at the shoulder main groove 41d-side block. This tends to partially wear the shoulder main groove 41d-side block.

As illustrated in FIG. 7B, a length TB from the tread profile TP to the belt cord 15a of the protection belt 15 on the outermost diameter position in the belt layer 10 may be determined based on the position of the tire-equatorial plane and the position of the shoulder main groove 41d. In this case, a length $TB_{CE}$ on the tire-equatorial plane and a length $TB_{SH}$ on the shoulder main groove 41d preferably satisfy a relationship of $1.1 \leq TB_{CE}/TB_{SH} \leq 1.6$.

Since the above relationship is satisfied between $TB_{CE}$ and $TB_{SH}$, the partial wear resistance of the tread portion 2 can be enhanced. If $TB_{CE}$ is less than 1.1 times as small as $TB_{SH}$, the center line Ce-side block is hard to come into contact with the ground as compared with the shoulder main groove 41d-side block, so that a skid occurs at the center line Ce-side block. This tends to partially wear the center line Ce-side block. On the other hand, if $TB_{CE}$ is 1.6 times as large as $TB_{SH}$, the shoulder main groove 41d-side block is hard to come into contact with the ground as compared with the center line Ce-side block, so that a skid occurs at the shoulder main groove 41d-side block. This tends to partially wear the shoulder main groove 41d-side block.

As illustrated in FIG. 7C, a length TC from the groove bottom line to the belt cord 13a of the reinforcement belt 13 may be determined based on the position of the tire-equatorial plane and the position of the shoulder main groove 41d. In this case, a length $TC_{CE}$ on the tire-equatorial plane and a length $TC_{SH}$ at the shoulder main groove 41d preferably satisfy a relationship of $1.3 \leq TC_{CE}/TC_{SH} \leq 1.8$.

Since the above relationship is satisfied between $TC_{CE}$ and $TC_{SH}$, the partial wear resistance of the tread portion 2 can be enhanced. If $TC_{CE}$ is less than 1.3 times as small as $TC_{SH}$, the center line Ce-side block is hard to come into contact with the ground as compared with the shoulder main groove 41d-side block, so that a skid occurs at the center line Ce-side block. This tends to partially wear the center line Ce-side block. On the other hand, if $TC_{CE}$ is 1.8 times as large as $TC_{SH}$, the shoulder main groove 41d-side block is hard to come into contact with the ground as compared with the center line Ce-side block, so that a skid occurs at the shoulder main groove 41d-side block. This tends to partially wear the shoulder main groove 41d-side block.

As illustrated in FIG. 7D, a length TD from the tread profile TP to the belt cord 13a of the reinforcement belt 13 may be determined based on the position of the tire-equatorial plane and the position of the shoulder main groove 41d. In this case, a length $TD_{CE}$ on the tire-equatorial plane and a length $TD_{SH}$ at the shoulder main groove 41d preferably satisfy a relationship of $1.0 \leq TD_{CE}/TD_{SH} \leq 1.4$.

Since the above relationship is satisfied between $TD_{CE}$ and $TD_{SH}$, the partial wear resistance of the tread portion 2 can be enhanced. If $TD_{CE}$ is less than 1.0 time as small as $TD_{SH}$, the center line Ce-side block is hard to come into contact with the ground as compared with the shoulder main groove 41d-side block, so that a skid occurs at the center line Ce-side block. This tends to partially wear the center line Ce-side block. On the other hand, if $TD_{CE}$ is 1.4 times as large as $TD_{SH}$, the shoulder main groove 41d-side block is hard to come into contact with the ground as compared with the center line Ce-side block, so that a skid occurs at the shoulder main groove 41d-side block. This tends to partially wear the shoulder main groove 41d-side block.

The tire according to the present invention is favorably applicable to a pneumatic tire (so-called super single tire) having an aspect ratio of not larger than 70% and a nominal section width of not smaller than 365. The tire according to the present invention is also applicable to a pneumatic tire having a small aspect ratio and falling outer side a range of a pneumatic radial tire for heavy load.

What is claimed is:

1. A pneumatic tire, comprising a belt layer arranged between a carcass and a tread portion,
    wherein the belt layer comprises:
    a first main working belt;
    a second main working belt arranged at an outer side of the first main working belt in a tire-radial direction, and
    a reinforcement belt,
    wherein a cord angle of the second main working belt differs from a cord angle of the first main working belt in a direction with respect to a tire-circumferential direction,
    wherein a cord angle of the reinforcement belt is not smaller than 6 degrees and not larger than 9 degrees,
    wherein a width of the reinforcement belt is equal to or wider than 50% of a tire-section width and not wider than either narrower one of the first and second main working belts,
    wherein in a state in which the pneumatic tire is mounted on a predetermined rim and is filled with a minute internal pressure with no load applied thereto, an arc passing points on both maximum width positions of the reinforcement belt and a point on a tire-equatorial plane of the reinforcement belt, in meridian section, has a radius of curvature of not smaller than 2500 mm, and
    wherein a total thickness $T_{CE}$ from a tread profile to a tire-inner peripheral surface on the tire-equatorial plane and a total thickness $T_{SH}$ from a tread profile to a tire-inner peripheral surface at an outermost main groove, on an outermost side in a tire-width direction, of main grooves extending in a circumferential direction satisfy a relationship of $1.05T_{SH} \leq T_{CE} \leq 1.35T_{SH}$.

2. The pneumatic tire according to claim 1, wherein when an imaginary line connecting bottoms of the main grooves in the tire-width direction is defined as a groove bottom line and the belt, on the outermost side in the tire-radial direction, of the belt layers is defined as an outermost belt, a thickness $TA_{CE}$ from the groove bottom line to the outermost belt on the tire-equatorial plane and a thickness $TA_{SH}$ from the groove bottom line to the outermost belt at the outermost main groove satisfy a relationship of $1.5TA_{SH} \leq TA_{CE} \leq 2.5TA_{SH}$.

3. The pneumatic tire according to claim 1, wherein when the belt, on the outermost side in the tire-radial direction, of the belt layers is defined as an outermost belt, a thickness $TB_{CE}$ from the tread profile to the outermost belt on the tire-equatorial plane and a thickness $TB_{SH}$ from the tread profile to the outermost belt at the outermost main groove satisfy a relationship of $1.1TB_{SH} \leq TB_{CE} \leq 1.6TB_{SH}$.

4. The pneumatic tire according to claim 1, wherein when an imaginary line connecting bottoms of the main grooves in the tire-width direction is defined as a groove bottom line, a thickness $TC_{CE}$ from the groove bottom line to the reinforcement belt on the tire-equatorial plane and a thickness $TC_{SH}$ from the groove bottom line to the reinforcement belt at the outermost main groove satisfy a relationship of $1.3TC_{SH} \leq TC_{CE} \leq 1.8TC_{SH}$.

5. The pneumatic tire according to claim 1, wherein
    a thickness $TD_{CE}$ from the tread profile to the reinforcement belt on the tire-equatorial plane and a thickness $TD_{SH}$ from the tread profile to the reinforcement belt at the outermost main groove satisfy a relationship of $1.0TD_{SH} \leq TD_{CE} \leq 1.4TD_{SH}$.

6. The pneumatic tire according to claim 1, wherein the pneumatic tire has an aspect ratio of not larger than 70% and a nominal section width of not smaller than 365.

* * * * *